(12) United States Patent
Kim et al.

(10) Patent No.: US 9,776,172 B2
(45) Date of Patent: Oct. 3, 2017

(54) POROUS SILICON CARBIDE NANOCOMPOSITE STRUCTURE COMPRISING NANOWIRES AND METHOD OF PREPARING THE SAME

(71) Applicant: KOREA INSTITUTE OF SCIENCE AND TECHNOLOGY, Seoul (KR)

(72) Inventors: Sang Woo Kim, Seoul (KR); In Ho Kim, Gyeonggi-do (KR); Dong Ju Moon, Seoul (KR)

(73) Assignee: KOREA INSTITUTE OF SCIENCE AND TECHNOLOGY, Seoul (KR)

( * ) Notice: Subject to any disclaimer, the term of this patent is extended or adjusted under 35 U.S.C. 154(b) by 385 days.

(21) Appl. No.: 13/975,861

(22) Filed: Aug. 26, 2013

(65) Prior Publication Data
US 2014/0194278 A1 Jul. 10, 2014

(30) Foreign Application Priority Data
Jan. 10, 2013 (KR) ........................ 10-2013-0003143

(51) Int. Cl.
| | | |
|---|---|---|
| *B01J 27/224* | (2006.01) | |
| *B01J 23/42* | (2006.01) | |
| *B01J 23/44* | (2006.01) | |
| *B01J 23/46* | (2006.01) | |
| *B01J 23/50* | (2006.01) | |
| *B01J 23/52* | (2006.01) | |
| *B01J 23/72* | (2006.01) | |
| *B01J 23/745* | (2006.01) | |
| *B01J 23/75* | (2006.01) | |
| *B01J 23/755* | (2006.01) | |
| *B01J 35/06* | (2006.01) | |

(Continued)

(52) U.S. Cl.
CPC ............... *B01J 23/42* (2013.01); *B01J 23/44* (2013.01); *B01J 23/464* (2013.01); *B01J 23/50* (2013.01); *B01J 23/52* (2013.01); *B01J 23/72* (2013.01); *B01J 23/745* (2013.01); *B01J 23/75* (2013.01); *B01J 23/755* (2013.01); *B01J 35/06* (2013.01); *B01J 35/1014* (2013.01); *B01J 35/1038* (2013.01); *B01J 35/1061* (2013.01); *B01J 37/0009* (2013.01); *B82Y 30/00* (2013.01); *B82Y 40/00* (2013.01)

(58) Field of Classification Search
CPC ...................................................... B01J 27/224
See application file for complete search history.

(56) References Cited

FOREIGN PATENT DOCUMENTS

| JP | 2012153596 A | * | 8/2012 |
|---|---|---|---|
| KR | 1020090041970 A | | 4/2009 |

OTHER PUBLICATIONS

Fukushima et al., "Permeation and aerosol filtration behaviour of SiC foams decorated with ceramic nanowires," Proceedings of the 12th Conference of the European Ceramic Society, Jun. 2011.*

(Continued)

*Primary Examiner* — Melvin C Mayes
*Assistant Examiner* — James Corno
(74) *Attorney, Agent, or Firm* — Ladas & Parry LLP; Loren K. Thompson

(57) ABSTRACT

Provided are a porous silicon carbide nanocomposite structure comprising nanowires that are self-formed, a preparation method thereof, and a catalyst comprising the same, in which the catalyst with excellent activity may be prepared by uniformly supporting a catalytically active component in meso-macro pores and nanowires.

19 Claims, 11 Drawing Sheets

(51) Int. Cl.
  *B01J 35/10*   (2006.01)
  *B01J 37/00*   (2006.01)
  *B82Y 30/00*   (2011.01)
  *B82Y 40/00*   (2011.01)

(56) References Cited

OTHER PUBLICATIONS

Zhou et al. ("Synthesis of crystalline alumina nanowires and nanotrees," Chemical Physics Letters 365(5-6), pp. 505-508, Nov. 2002.*

Wang et al., "Molten Salt Synthesis of Mullite Whiskers from Silicon Carbide Precursor," Materials Science Forum 724, pp. 299-302, Jun. 2012.*

Fukushima et al., "Decoration of Ceramic Foams by Ceramic Nanowires via Catalyst-Assisted Pyrolysis of Preceramic Polymers," Journal of the American Chemical Society 95(10), pp. 3071-3077, Oct. 2012.*

Dogu, "Diffusion and Reaction in Catalyst Pellets with Bidisperse Pore Size Distribution," Industrial & Engineering Chemistry Research 37(6), pp. 2158-2171, Mar. 1998.*

Lepage, "Support and promoter effects in automotive exhaust catalysis," Doctoral dissertation, Utrecht University Repository, Jun. 2009.*

Hyeonseok Yoon, et al; "Nitrogen-doped magnetic carbon nanoparticles as catalyst supports for efficient recovery and recycling"; Chemical Communication, pp. 1468-1470; First published as an Advance Article on the web Mar. 5, 2007.

Korean Intellectual Property Office Notice of Non-Final Rejection dated Mar. 27, 2014; Appln. No. 10-2013-0003143.

Inho Kim, et al; "Synthesis and Characterization of SiC Nanocomposite Catalyst Supports with Self-formed Nanowires", IUMRS International Union of Materials Research Society-International Conference in Asia 2012; Aug. 26-31, 2012/BEXCO, Busan, Korea, 4 pages.

\* cited by examiner

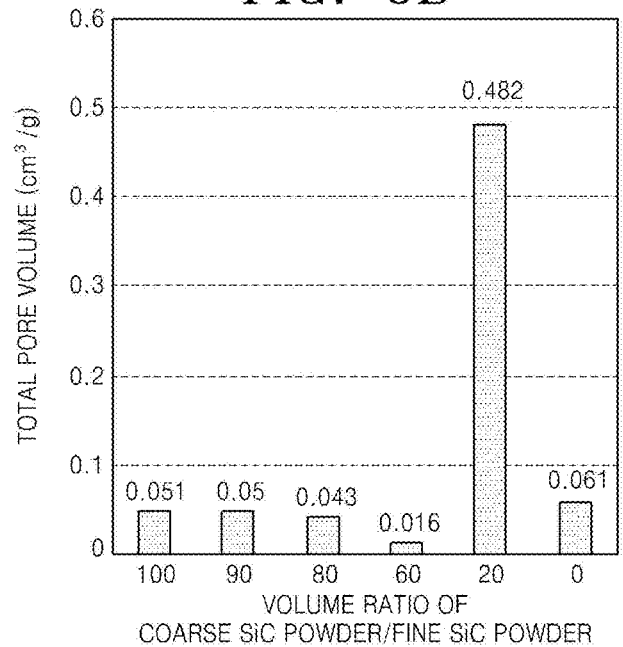
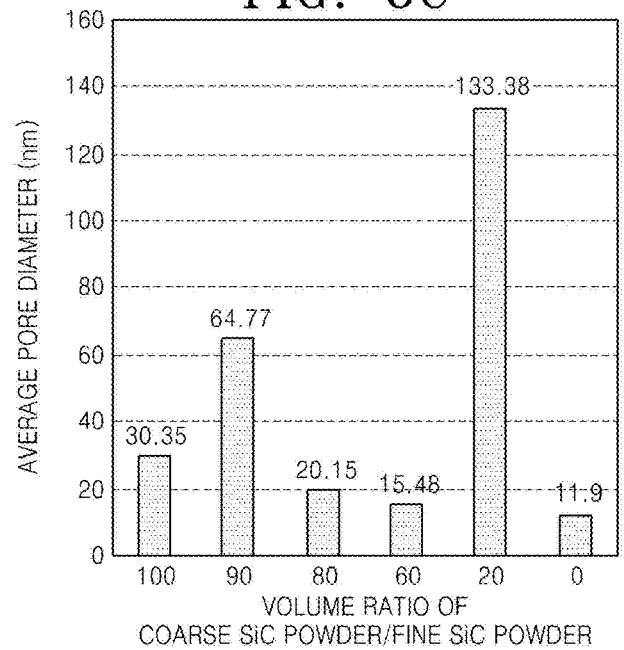

POROUS SILICON CARBIDE NANOCOMPOSITE STRUCTURE COMPRISING NANOWIRES AND METHOD OF PREPARING THE SAME

CROSS-REFERENCE TO RELATED PATENT APPLICATION

This application claims the benefit of Korean Patent Application No. 10-2013-0003143, filed on Jan. 10, 2013, in the Korean Intellectual Property Office, the disclosure of which is incorporated herein in its entirety by reference.

BACKGROUND OF THE INVENTION

1. Field of the Invention

The present invention relates to a silicon carbide nanocomposite structure and a method of preparing the same, and more particularly, to a porous silicon carbide nanocomposite structure comprising nanowires which is self-formed on the surface of a porous body and in the internal pores thereof, and a method of preparing the same.

2. Description of the Related Art

In general, silicon carbide has low density and thermal expansion coefficient, and high melting point, strength, and hardness due to covalent bonds. Therefore, silicon carbide has excellent thermal stability and mechanical properties and thus has been widely used not only as a catalyst support working at high temperature, an adsorbent, or a filter for removing automobile exhaust fumes or filtering dust particles, but also as an abrasive material due to high hardness.

Silicon carbide has high strength, excellent chemical stability, and excellent electrical characteristics and thus may be used under an environment of high temperature and high voltage. However, since silicon carbide is sintering-resistant, it is not easily sintered even when being subjected to heat treatment at high temperature, and thus, there is a problem in that a silicon carbide material has cracks by stress during cooling, which reduces strength. Therefore, in order to make the material have porosity, a porous body is manufactured using a template, or a honeycomb structure in which a plurality of honeycomb segments are bonded to one another is prepared and used as a filter. As another method, a robust porous silicon carbide material is also prepared by binding silicon carbide particles at high temperature using a necking agent, and performing sintering.

Meanwhile, since a silicon carbide porous body is obtained by heat treatment at high temperature, nanopores disappear during heat treatment and thus it is difficult to obtain a nano porous body, and accordingly, a macro porous body having a low specific surface area is easily obtained. Therefore, the present invention prepares a silicon carbide nanocomposite structure comprising nanowires in which nanowires are self-formed on the surface of and the inside of the silicon carbide porous body, as means for enhancing the specific surface area.

Studies have been conducted on formation of silicon carbide nanowires in a silicon carbide porous body. However, said silicon carbide nanowires need to be synthesized through carbothermal reduction of carbon and silicon dioxide at 1,300° C. to 1500° C. for a long time, and thus it is difficult to achieve commercialization due to an increase in preparation costs.

In order to overcome these drawbacks, studies have been conducted on reducing the reaction temperature by mixing nano-sized silicon powder and carbon powder as another method. However, in doing so, expensive nano-sized silicon powder and expensive carbon materials such as carbon nanotube, activated carbon, and the like need to be used, and thus there is a disadvantage that the product price is rapidly increased.

The present inventors have focused attention on a silicon carbide nanocomposite structure that easily forms nanowires on the surface of and the inside of a porous silicon carbide at low temperature.

That is, the present inventors have found that a catalytically active component may be supported more efficiently by deriving a condition under which Si—Al—O-based nanowires may be self-grown at low temperature in a porous silicon carbide base material, and by controlling the growth condition, thereby completing the present invention.

SUMMARY OF THE INVENTION

The present invention provides a silicon carbide nanocomposite structure having excellent thermal properties and catalytic activity.

The present invention also provides a method of preparing the silicon carbide nanocomposite structure.

The present invention also provides a catalyst supported by the silicon carbide nanocomposite structure.

The present invention also provides a method of preparing the catalyst supported by the silicon carbide nanocomposite structure.

According to an aspect of the present invention, there is provided a silicon carbide nanocomposite structure, comprising: a silicon carbide nanocomposite having a meso-macro pore structure; and a Si—Al—O-based nanowire formed on the surface of and inside the silicon carbide nanocomposite.

According to another aspect of the present invention, there is provided a method for preparing the silicon carbide nanocomposite structure, the method comprising: forming a composite comprising silicon carbide, an inorganic binder, and transition metal nanoparticles by treating a mixture comprising a silicon carbide particle, an inorganic binder precursor, and a transition metal precursor with supercritical carbon dioxide; adding a binder to the composite and then molding the mixture to obtain a molded body; and sintering the molded body.

According to an exemplary embodiment of the present invention, the treating of the mixture comprising a silicon carbide particle, an inorganic binder precursor, and a transition metal precursor with supercritical carbon dioxide may be performed by first treating the silicon carbide particle and the inorganic binder precursor with supercritical carbon dioxide, adding the transition metal precursor thereto, and again treating the mixture with supercritical carbon dioxide, or mixing the silicon carbide particle, the inorganic binder precursor, and the transition metal precursor and treating the mixture with supercritical carbon dioxide at a time.

According to still another aspect of the present invention, there is provided a catalyst comprising: the silicon carbide nanocomposite structure; and a catalytically active component supported by the silicon carbide nanocomposite structure.

According to yet another aspect of the present invention, there is provided a method for preparing an active nanocatalyst, the method comprising: supporting a catalytically active component precursor by the silicon carbide nanocomposite structure; and subjecting the silicon carbide nanocomposite structure by which the catalytically active component precursor is supported to heat treatment in a hydrogen gas atmosphere.

According to the preparation method according to an exemplary embodiment of the present invention, most of the catalytically active component is present in nanowires which are present on the surface of the silicon carbide nanocomposite and in the internal pores thereof, and thus may contact with a reaction gas more efficiently. Further, it is possible to control the specific surface area and porosity of the silicon carbide nanocomposite structure and the diameter and length of the nanowires by varying preparation conditions such as an organic solvent to be used, a metal precursor, reaction temperature, reaction pressure, heat treatment temperature and atmosphere, reduction temperature, and the like.

BRIEF DESCRIPTION OF THE DRAWINGS

The above and other features and advantages of the present invention will become more apparent by describing in detail exemplary embodiments thereof with reference to the attached drawings in which:

FIGS. 6A, 6B, and 6C are views respectively illustrating a specific surface area, a total pore volume, and an average pore size according to the mixing ratio of particle sizes of the silicon carbide prepared according to Examples 12 to 17;

DETAILED DESCRIPTION OF THE INVENTION

Hereinafter, the present invention will be described in more detail.

The "silicon carbide nanocomposite" in the present specification means a composite comprising silicon carbide as a main component, and an inorganic binder and a transition metal in addition to silicon carbide, and having nano-sized pores.

The "silicon carbide nanocomposite structure" in the present specification means a composite structure together having nanowires in the composite comprising silicon carbide as a main component, and an inorganic binder and a transition metal in addition to silicon carbide, and having nano-sized pores.

The silicon carbide nanocomposite structure according to an aspect of the present invention provides a silicon carbide nanocomposite structure comprising: a silicon carbide nanocomposite having a meso-macro pore structure; and an Si—Al—O-based nanowire formed on the surface of and inside the silicon carbide nanocomposite.

Figure 1:
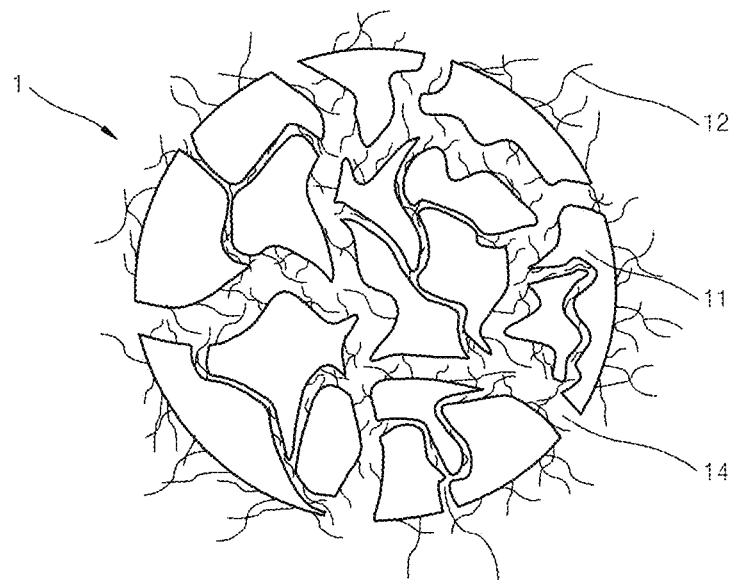
FIG. 1 is a view schematically illustrating the silicon carbide nanocomposite structure according to an exemplary embodiment of the present invention.

FIG. 1 is a view schematically illustrating the silicon carbide nanocomposite structure according to an exemplary embodiment of the present invention.

A silicon carbide nanocomposite structure 1 according to an aspect of the present invention comprises nanowires 12 on the surface of and inside a structure of meso pores 13-macro pores 14 of a silicon carbide nanocomposite 11. Therefore, the specific surface area increases and a catalytically active component may be easily supported by the meso-macro pores and nanowires, and thus a catalyst with excellent activity may be provided. In addition, since most of the catalytically active component is present in the nanowires, it is possible to suppress the growth of the catalyst in the heat treatment step during preparation of the catalyst and provide a catalyst with excellent long-term stability.

The silicon carbide nanocomposite having the meso-macro pore structure comprises silicon carbide as a main component, and may further comprise an inorganic binder and a transition metal.

The inorganic binder may be one or more selected from aluminum oxide, silicon oxide, and magnesium oxide.

The transition metal may be nickel or cobalt.

The inorganic binder may be comprised in an amount from 10% by weight to 30% by weight of the silicon carbide nanocomposite having the meso-macro pore structure.

The transition metal may be comprised in an amount from 1% by weight to 10% by weight of the silicon carbide nanocomposite having the meso-macro pore structure.

The Si—Al—O-based nanowire comprises silicon as a main component, and may comprise Al and O elements.

The nanowire may have a diameter from 10 to 100 nm.

In the silicon carbide nanocomposite having the meso-macro pore structure, the meso pore may have a diameter from 2 to 50 nm and a pore volume from 0.05 to 2 $cm^3/g$.

In the silicon carbide nanocomposite having the meso-macro pore structure, the meso pore may have a diameter from 50 to 5,000 nm and a pore volume from 0.05 to 20 $cm^3/g$.

The transition metal may serve as a seed that allow nanowires to be self-grown.

The silicon carbide nanocomposite structure may be prepared by a method comprising: forming a composite comprising silicon carbide, an inorganic binder, and transition metal nanoparticles by treating a mixture comprising a silicon carbide particle, an inorganic binder precursor, and a transition metal precursor with supercritical carbon dioxide; adding a binder to the composite and then molding the mixture to obtain a molded body; and subjecting the molded body to heat treatment.

According to an exemplary embodiment of the present invention, the treating of the mixture comprising a silicon carbide particle, an inorganic binder precursor, and a transition metal precursor with supercritical carbon dioxide may be performed by first treating the silicon carbide particle and the inorganic binder precursor with supercritical carbon dioxide, adding the transition metal precursor thereto, and again treating the mixture with supercritical carbon dioxide, or mixing the silicon carbide particle, the inorganic binder precursor, and the transition metal precursor and treating the mixture with supercritical carbon dioxide at a time.

The size of the silicon carbide particle is not particularly limited, but it is possible to use a mixture prepared by mixing particles with single or various sizes having an average diameter in a range from 0.1 to 20 μm, for example, by mixing silicon carbides with various particle sizes such as 1.2 μm, 5.5 μm, and 8.4 μm. The formation of a pore structure may be promoted by mixing particles with various sizes and using the mixture.

As the inorganic binder precursor used in the preparation method, it is possible to use one or more selected from aluminum nitrate, aluminum chloride, aluminum sulfate, aluminum acetate, aluminum oxalate, aluminum formate, aluminum propionate, and aluminum alkoxide. When the inorganic binder is silicon oxide or magnesium oxide, each precursor may be a silicon compound(s) or a magnesium compound(s), which may be selected from the group listed in the same manner as one for the aluminum compound(s) above.

The inorganic binder precursor may be used in an amount to provide the weight ratio of silicon carbide and the inorganic binder of from 1:9 to 9:1, and particularly, of from 3:4 to 7:3 when the inorganic binder is formed by the reaction of the inorganic binder precursor.

The inorganic binder precursor and the transition metal precursor may be dissolved in an organic solvent and the resulting solution may be used. As the organic solvent, an alcohol-based organic solvent is preferably used, and for example, methanol or ethanol may be used. The concentration of the inorganic binder precursor is not particularly limited, but may be 0.05 to 1 M.

As the transition metal precursor used in the preparation method, it is possible to use one or more selected from nickel nitrate, nickel chloride, nickel sulfide, nickel oxalate, nickel citrate, nickel formate, and nickel acetate. When the transition metal is cobalt, the precursor may be a cobalt compound(s), which may be selected from the group listed in the same manner as one for the nickel compound(s) above.

The transition metal precursor may be mixed such that the content of the transition metal nanoparticles are from 1 to 20 parts by weight based on 100 parts by weight of silicon carbide, when the transition metal nanoparticles are formed.

The supercritical carbon dioxide treatment may be performed by maintaining the carbon dioxide fluid used in the supercritical carbon dioxide treatment at a temperature from 160 to 200° C. and a pressure from 70 to 200 bar for a reaction time from 10 minutes to 5 hours.

A binder, water, an organic solvent and the like are added to composite particles synthesized from the silicon carbide particle, the inorganic binder precursor, and the transition metal precursor using supercritical carbon dioxide; and are mixed to be a paste-type or clay-type mixture. The resulting mixture may be easily molded into a shape such as a bead type, a pellet type, a beehive shape, and the like by performing extrusion molding, press molding, coating on a sheet, and the like, with an apparatus such as a plunger-type extruder, a screw-type extruder, and the like.

As the binder, it is possible to use one or more selected from inorganic binders and organic binders. Examples of the inorganic binders include aluminum oxide, magnesium oxide, silicon oxide, and the like. When silicon carbide particles are molded into the form of bead, pellet, and the like, the inorganic binder allows particles to be strongly bonded to each other and maintain molding strength, and thus allows the silicon carbide nanocomposite structure to maintain high strength even after sintering.

As the organic binders, those known in the art may be used without limitation, and it is possible to use one or more selected from cellulose, polyvinyl alcohol, polyvinylpyrrolidone, polyethylene glycol, and starch.

If necessary, the molded body may be immersed in an organic solvent of aromatic hydrocarbons such as toluene, or an alcohol-based organic solvent, and the solvent may act as an anti-solvent to help controlling the molded shape.

The growing and sintering of the nanowires may be performed by drying the molded body and then subjecting the molded body to heat treatment. The heat treatment may be performed by increasing temperature from normal temperature to 800 to 1,300° C. at a rate of 1 to 10° C. per minute, maintaining the temperature for 30 minutes to 5 hours, and again decreasing temperature to normal temperature at a rate of a rate of 1 to 10° C. per minute, and using nitrogen, helium, or a mixed gas thereof as a carrier gas.

The silicon carbide nanocomposite structure prepared by the method according to an exemplary embodiment of the present invention has meso and macro pores with a size from several tens of nanometers to several hundreds of nanometers, and the pore size may be controlled by varying the composition of the reactants and the reaction conditions.

In the sintering step, nanowires are grown, and as nanowires are grown, a meso-macro pore structure is formed through transfer of elements around the nanowires.

According to another aspect of the present invention, there is provided a catalyst comprising: the silicon carbide nanocomposite structure; and a catalytically active component supported by the silicon carbide nanocomposite structure.

Figure 2:
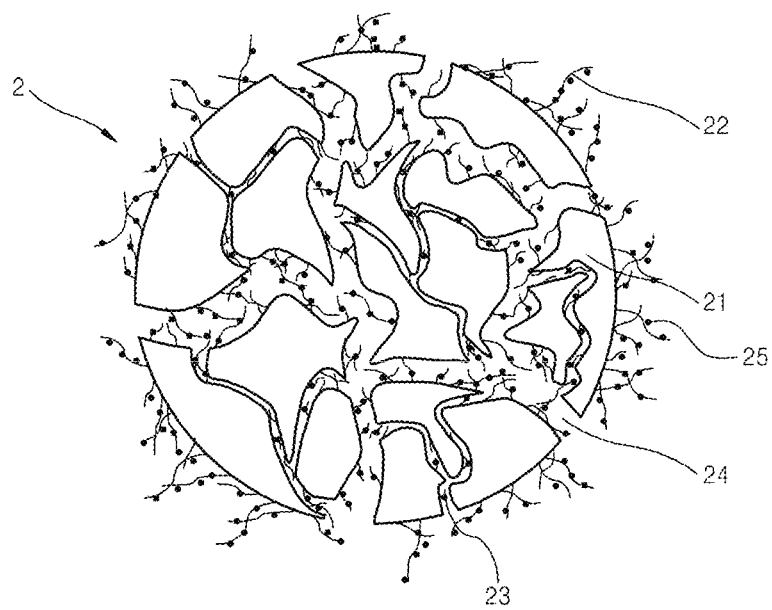
FIG. 2 is a view schematically illustrating a catalyst of which a catalytically active component is supported by the silicon carbide nanocomposite structure according to an exemplary embodiment of the present invention.

FIG. 2 is a view schematically illustrating a catalyst in which a catalytically active component is supported by the silicon carbide nanocomposite structure according to an exemplary embodiment of the present invention. As illustrated in FIG. 2, the catalytically active component 25 is uniformly present not only in the meso pore 23-macro pore 24 of the silicon carbide nanocomposite 21, but also on the nanowire 22. Accordingly, a catalyst 2 with excellent activity may be provided.

The catalytically active component may be varied according to the use of the catalyst. The catalytically active component is not particularly limited, but may include one or more selected from the group consisting of Ni, Co, Ru, Rh, Cu, Ag, Au, Pt, Pd, Sb, Sc, Sr, V, Cu, Y, Ce, Mo, W, Fe, Zr, Zn, Cd, Mn, Ca, Ba, Cs, Cr, Mg, Ti, Al, In, Sn, Se, Fe, Te, Ga, Gd, Ge, Dy, Pr, Sm, Ho, Lu, Tb, Eu, Nd, La, Ta, Hf, Er, and Yb.

According to another aspect of the present invention, the catalyst may be prepared by a method comprising: supporting a catalytically active component precursor by the silicon carbide nanocomposite structure; and subjecting the silicon carbide nanocomposite structure by which the catalytically active component precursor is supported to reduction heat treatment under a hydrogen gas atmosphere.

The method for supporting the catalytically active component precursor is not particularly limited, and for example, a supporting method, a kneading method, and the like may be used. Specifically, the method may be performed by impregnating the catalytically active component precursor in a solution comprising the support for the silicon carbide nanocomposite structure, drying the resulting mixture, and repeating said impregnating and drying. Further, the supporting may be performed under normal pressure or in a vacuum state, and the drying may be performed using a microwave to increase the support efficiency of the catalytically active component precursor.

In addition, where the treatment with supercritical carbon dioxide is performed after supporting the catalytically active component precursor, it may increase the supporting efficiency of the catalytically active component on the surface of the nanowire which is present in the silicon carbide nanocomposite structure. The treatment with supercritical carbon dioxide may be performed by maintaining the carbon dioxide fluid for the treatment at a temperature from 30 to 300° C. and a pressure from 5 to 350 bar for a reaction time from 1 minute to 50 hours.

The heat treatment step in the method for preparing a catalyst may be performed at 200 to 800° C.

In the method for preparing a catalyst according to an exemplary embodiment of the present invention, after supporting a catalytically active component or a catalytically active component precursor, a reduction of the catalytically active component precursor may be performed along with a carrier gas or a reactive gas such as hydrogen, nitrogen, argon, helium, alcohol, methane, propane, isobutane, and the like, depending on the type of the material. The gas may promote or suppress a reduction reaction of the catalytically active component precursor to help controlling the size and shape of catalyst particles.

The catalyst according to an exemplary embodiment of the present invention may achieve excellent catalytic activity, since the catalytically active component is present usually on nanowires of a silicon carbide nanocomposite structure.

The catalyst according to an exemplary embodiment of the present invention may be used in a process such as the Fischer-Tropsch (FT) process, the reforming process, the natural gas liquefaction (GTL), and the biocatalyst process.

Hereinafter, the present invention will be described in detail through Examples, but the present invention is not limited thereto.

Example 1

63.07 g of aluminum nitrate hexahydrate was dissolved in 60 mL of ethanol, 20 g of silicon carbide having an average diameter from 0.9 to 1.5 μm was added thereto, and then the mixture was put into a supercritical reaction vessel. While stirring the mixture, a carbon dioxide fluid was introduced thereinto. After increasing temperature and pressure to 200° C. and 200 bar, the obtained supercritical carbon dioxide state was maintained for 15 minutes for reaction of the mixture. Thereafter, the mixture was cooled to normal temperature, and pressure was slowly dropped to normal pressure. 35.33 g of nickel nitrate hexahydrate was added thereto and dissolved, then the resulting solution was again put into the supercritical reaction vessel. While stirring the mixture, the carbon dioxide fluid was introduced thereinto. After increasing temperature and pressure to 160° C. and 200 bar, the obtained supercritical carbon dioxide state was maintained for 15 minutes for reaction of the mixture. Thereafter, the mixture was cooled to normal temperature, pressure was slowly dropped to normal pressure, and then reaction product powders were obtained by separating and drying the filtrate. Here, the composition of the reaction products was 56 parts by weight of silicon carbide, 24 parts by weight of aluminum oxide, and 20 parts by weight of nickel based on the reaction products after heat treatment.

A cellulose binder and water were added to the reaction products and were mixed to prepare a paste, and then extrusion molding was performed to obtain a molded body in the form of a cylindrical bead having a diameter from about 0.5 to about 3 mm and a height from 0.5 to 5 mm.

The heat treatment of the molded body was performed by increasing temperature to 1,100° C. at a rate of 5° C./min under a nitrogen atmosphere, and maintaining the temperature for 1 hour. As a result, silicon carbide nanocomposite structures were obtained as a final product.

Figure 3A:
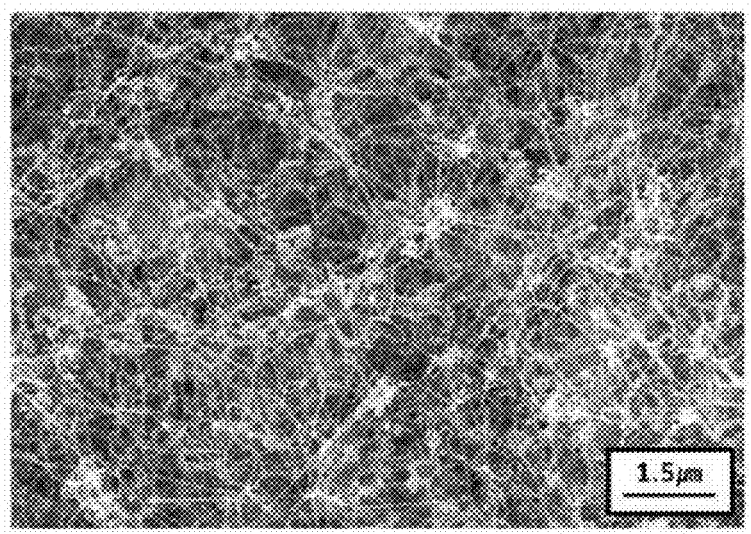
FIGS. 3A and 3B (enlarged photo) are FE-SEM photos of the surface of the silicon carbide nanocomposite structure prepared according to Example 1 of the present invention.
Figure 3B:
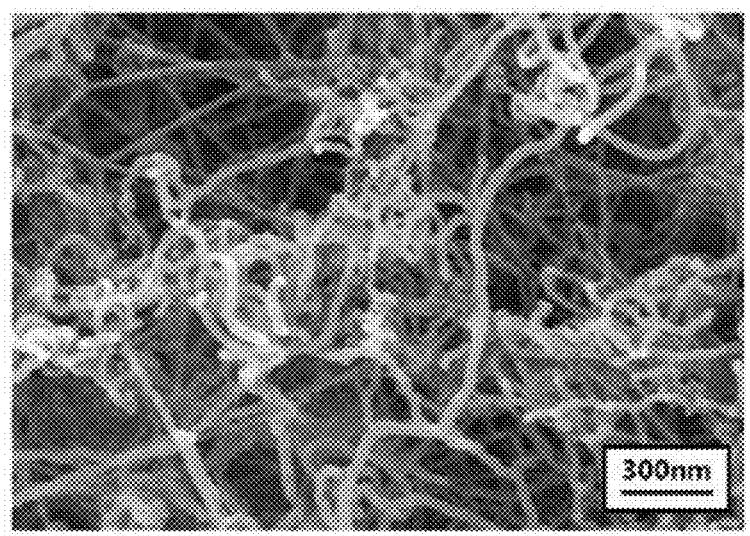
Figure 4A:
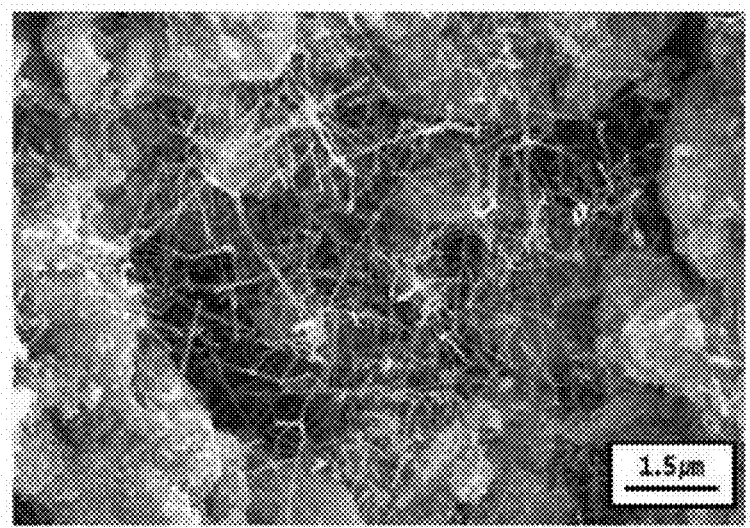
FIGS. 4A and 4B (enlarged photo) are FE-SEM photos of the inside of the silicon carbide nanocomposite structure prepared according to Example 1 of the present invention.
Figure 4B:
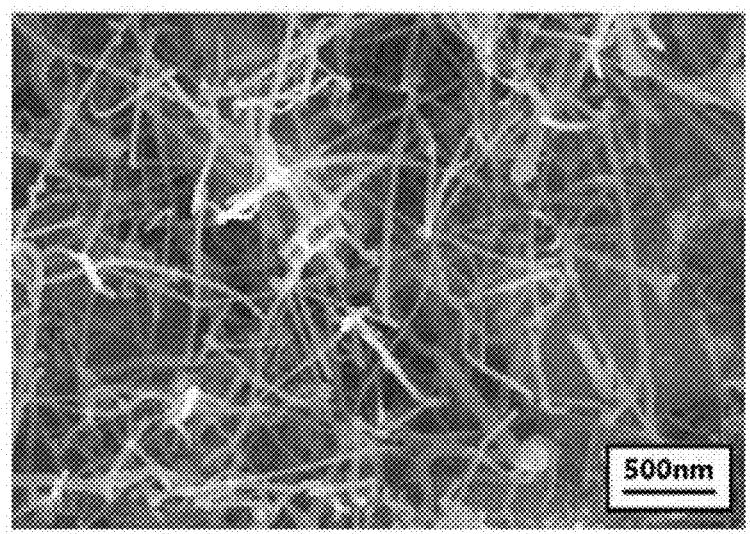

FIGS. 3A to 4B are FE-SEM photos of the surface and the inside of the nanocomposite structure prepared above. As illustrated in FIGS. 3A and 3B (enlarged photo of FIG. 3A), it can be seen that nanowires are formed on the surface of the silicon carbide nanocomposite structure. In addition, as illustrated in FIGS. 5A and 5B (enlarged photo of FIG. 5A), it can be seen that nanowires are formed in the internal pores of the silicon carbide nanocomposite structure. Therefore, in the silicon carbide nanocomposite structure according to an exemplary embodiment of the present invention, it can be seen that nanowires are all present on the surface of and inside the silicon carbide nanocomposite.

Examples 2 to 4

A silicon carbide nanocomposite structure was prepared in the same manner as in Example 1, except that the composition (weight ratio) of silicon carbide, aluminum oxide, and nickel was changed as in the following Table 1.

Examples 5 and 6

A silicon carbide nanocomposite structure was prepared in the same manner as in Example 1, except that the heat treatment temperature was changed as in the following Table 1.

TABLE 1

| Example No. | Composition | | | Heat treatment temperature (° C.) |
|---|---|---|---|---|
| | SiC | Al$_2$O$_3$ | Ni | |
| 1 | 56 | 24 | 20 | 1,100 |
| 2 | 63 | 27 | 10 | 1,100 |
| 3 | 66.5 | 28.5 | 5 | 1,100 |
| 4 | 63 | 27 | 10 | 1,100 |
| 5 | 56 | 24 | 20 | 1,200 |
| 6 | 56 | 24 | 20 | 1,300 |

The following Table 2 shows the specific surface areas, total pore volumes, and average pore diameters of the silicon carbide nanocomposite structures according to Examples 1 to 4, which were measured by the BET method.

Figure 5:
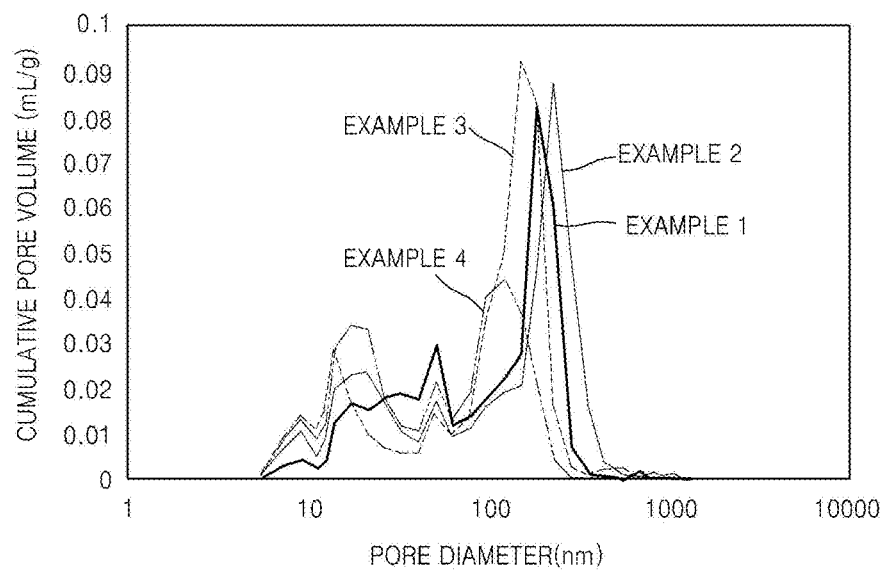
FIG. 5 is a view illustrating the pore size distribution measured by a mercury intrusion porosimetry, of the silicon carbide nanocomposite structures prepared according to Examples 1 to 4 of the present invention.

FIG. 5 is a graph showing the cumulative pore volume according to the pore diameter of the silicon carbide nanocomposite structures prepared according to Examples 1 to 4. From Table 2, it can be seen that the silicon carbide nanocomposite structures of Examples 1 to 4 are in a meso pore region in which an average pore diameter calculated from the total pore volume is about 15 to about 18 nm, but from the graph in FIG. 5, it can be seen that the silicon carbide nanocomposite structures have a bimodal pore distribution, that is, meso-macro pores.

TABLE 2

| Example No. | Specific surface area (m$^2$/g) | Total pore volume (cm$^3$/g) | Average pore diameter (nm) |
| --- | --- | --- | --- |
| 1 | 33.5 | 0.1454 | 17.359 |
| 2 | 37.8 | 0.1690 | 17.883 |
| 3 | 41.5 | 0.1702 | 16.422 |
| 4 | 35.9 | 0.1408 | 15.689 |

Examples 7 to 10

Silicon carbide nanocomposite structures were obtained in the same manner as in Examples 1 to 4, except that 63.07 g of aluminum nitrate hexahydrate and 35.33 g of nickel nitrate hexahydrate were dissolved in 60 mL of ethanol; 20 g of silicon carbide having an average diameter from 0.9 to 1.5 µm was added thereto; then the mixture was put into a supercritical reaction vessel; while stirring the mixture, a carbon dioxide fluid was introduced thereinto; after increasing temperature and pressure to 200° C. and 200 bar, the obtained supercritical carbon dioxide state was maintained for 15 minutes for reaction of the mixture then, temperature was cooled to normal temperature and pressure was slowly dropped to normal pressure.

The following Table 3 shows the surface area, total pore volume, and average pore diameter of the silicon carbide nanocomposite structures obtained in Examples 7 to 10.

TABLE 3

| Example No. | Specific surface area (m$^2$/g) | Total pore volume (cm$^3$/g) | Average pore diameter (nm) |
| --- | --- | --- | --- |
| 7 | 24.1 | 0.1454 | 17.359 |
| 8 | 25.9 | 0.1705 | 26.362 |
| 9 | 26.9 | 0.1348 | 20.477 |
| 10 | 28.7 | 0.1555 | 21.694 |

As shown in Table 3, it can be seen that the specific surface are is reduced by about 30% in the case of mixing silicon carbide particles, the aluminum oxide precursor, and the metal nickel precursor, and then treating the mixture with supercritical carbon dioxide at a time as in Examples 7 to 10.

Examples 11 to 17

In order to compare silicon carbide nanocomposites comprising nanowires in Examples 7 to 9 with a silicon carbide composite in which nanowires were not grown, the following Examples 11 to 17 were performed. The preparation of Example 11 was performed in the same manner as in Example 3, except that the nickel precursor for promoting the growth of nanowires was not added thereto.

In Examples 12 to 17, silicon carbide composite structures were obtained by mixing silicon carbide present as a coarse powder having a diameter from 7.4 to 8.6 µm with silicon carbide present as a fine powder having a diameter from 0.9 to 1.5 µm according to the volume ratio shown in the following Table 4, mixing the resulting mixture with a precipitate formed by adding an ammonia aqueous solution at 1 M to Mg(NO$_3$)$_2$·6H$_2$O at 1.2 M as an inorganic binder, molding the mixture into the form of bead, and subjecting the bead-type molded body to heat treatment at 1,300° C. for 1 hour. Table 4 shows the specific surface area, total pore volume, and average pore diameter of the obtained silicon carbide composite structures.

Figure 6A:
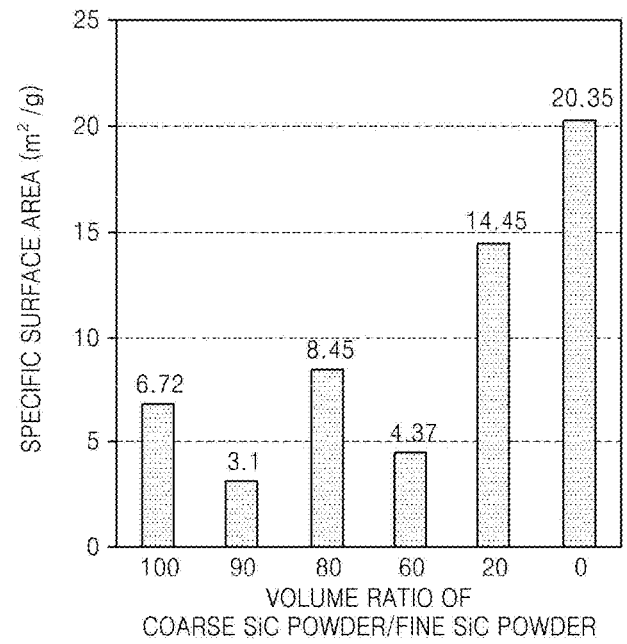

FIGS. 6A, 6B, and 6C are views respectively illustrating the specific surface area, the total pore volume, and the average pore size according to the particle size mixing ratio of the silicon carbide prepared by Examples 12 to 17.

TABLE 4

| Example No. | Composition ratio for the composite (Coarse powder:Fine powder) | Specific surface area (m$^2$/g) | Total pore volume (cm$^3$/g) | Average pore size (nm) |
| --- | --- | --- | --- | --- |
| 11 | 7:3 (0:10) | 20.42 | 0.1084 | 12.598 |
| 12 | 7:3 (10:0) | 6.72 | 0.051 | 30.35 |
| 13 | 7:3 (9:1) | 3.1 | 0.050 | 64.77 |
| 14 | 7:3 (8:2) | 8.45 | 0.043 | 20.15 |
| 15 | 7:3 (6:4) | 4.37 | 0.016 | 15.48 |
| 16 | 7:3 (2:8) | 14.45 | 0.482 | 133.38 |
| 17 | 7:3 (0:10) | 20.35 | 0.061 | 11.9 |

As shown in Table 4, it can be seen that the specific surface area, pore size, and total pore distribution may be effectively controlled by the particle size of the composite.

Preparation of Catalyst

Example 18

Nickel nitrate hexahydrate was weighed, and then impregnated into an alcohol solution in which the silicon carbide nanocomposite structure in the form of bead, which had been obtained in Example 9, was dissolved to have a molar concentration of 4.5 mol/L, such that nickel was present in an amount of 15 parts by weight based on 100 parts by weight of the nanocomposite structure. Thereafter, drying was performed at 100° C. using a microwave. The impregnating and drying step was repeated four times to penetrate a catalytically active material precursor into the silicon carbide nanocomposite structure support.

A supported nickel catalyst was obtained by increasing the temperature from normal temperature to 400° C. at a rate of 5° C. per minute under a mixed gas atmosphere of hydrogen and nitrogen at a volume fraction of 2:1, maintaining the silicon carbide nanocomposite structure by which the catalytically active material precursor had been supported at the temperature for 1 hour, and again decreasing the temperature to normal temperature at a rate of 5° C. per minute to reduce the catalytically active material precursor.

The specific surface area of the silicon carbide nanocomposite structure prepared in Example 9 was found to be 26.9 m$^2$/g as measured by the BET method. Meanwhile, the specific surface area of the catalyst by which nickel had been supported in Example 18 was found to be 44.1 m$^2$/g as measured by the BET method, and thus the specific surface area was increased by about 60% or more.

Figure 7A:
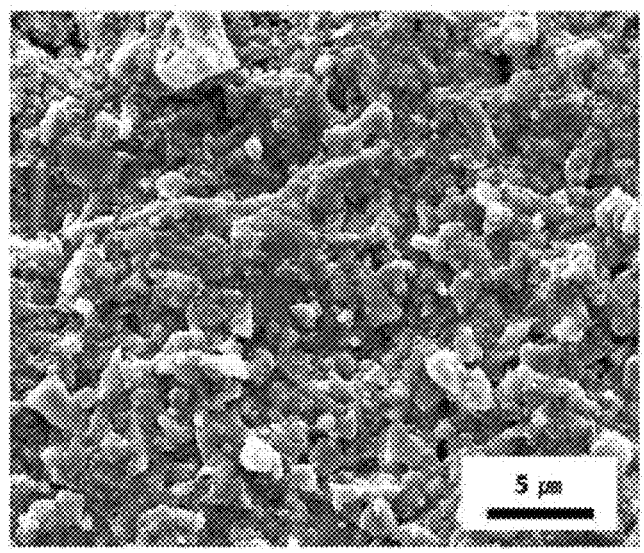
FIG. 7A is an FE-SEM photo of the silicon carbide nanocomposite structure which is prepared prior to a sintering heat treatment according to Example 9 of the present invention.
Figure 7B:
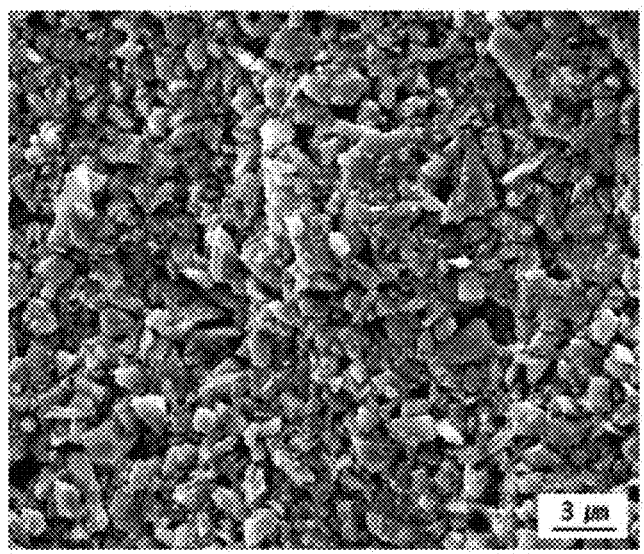
FIG. 7B is an FE-SEM photo of the silicon carbide nanocomposite structure which is prepared after the sintering heat treatment according to Example 11.

FIGS. 7A and 7B (enlarged photo of FIG. 7A) are FE-SEM photos of the composite prior to the heat treatment (sintering) step in Example 9. As illustrated in FIG. 7, it can be seen that nanowires had not yet been formed prior to the heat treatment.

Figure 8:
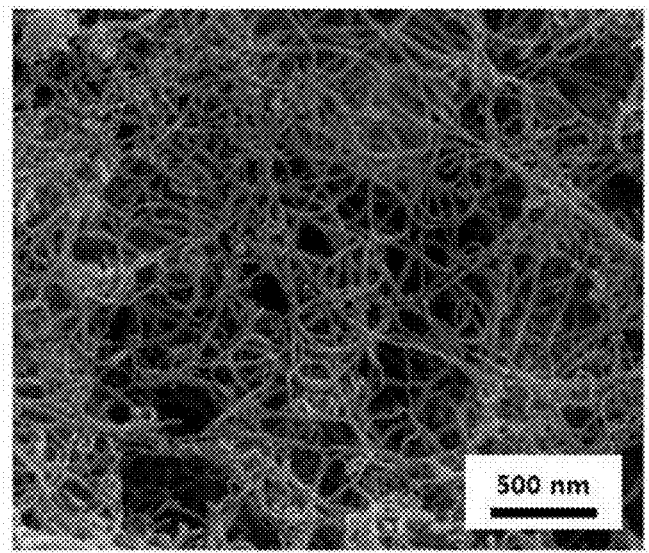
FIG. 8 is an FE-SEM photo of the surface of the catalyst which is prepared by reduction heat treatment without a supercritical fluid treatment after supporting of catalyst, according to Example 18.

FIG. 8 is an FE-SEM photo of the catalyst prepared in Example 18. As illustrated in FIG. 8, it can be seen that the catalytically active component is supported by the silicon carbide nanocomposite structure.

Figure 9:
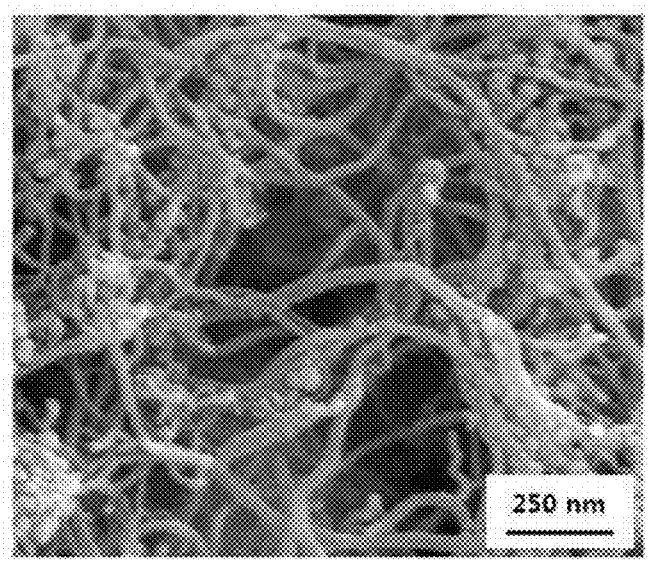
FIG. 9 is an enlarged FE-SEM photo of FIG. 8.

FIG. 9 is an enlarged FE-SEM photo of FIG. 8. As illustrated in FIG. 9, it can be seen that nickel as the catalytically active component is coated on the surface of the silicon carbide nanocomposite, but is not coated well on the surface of nanowires.

Example 19

A supported nickel catalyst was prepared in the same manner as in Example 18, except that a silicon carbide nanocomposite structure in which nickel nitrate hexahydrate had been impregnated was put into a supercritical reactor before being reduced, a carbon dioxide fluid was injected thereinto, temperature and pressure were increased to 160° C. and 100 bar, the mixture was maintained in the obtained supercritical carbon dioxide state for 1 hour for its reaction, and then temperature was cooled to normal temperature and pressure was slowly decreased to normal pressure.

The specific surface area of the catalyst prepared by the method was found to be 48.6 $m^2/g$ as measured by the BET method, and the specific surface area had been increased by about 10% more than the specific surface area of the catalyst prepared without being subjected to the supercritical reaction in Example 11.

Figure 10:
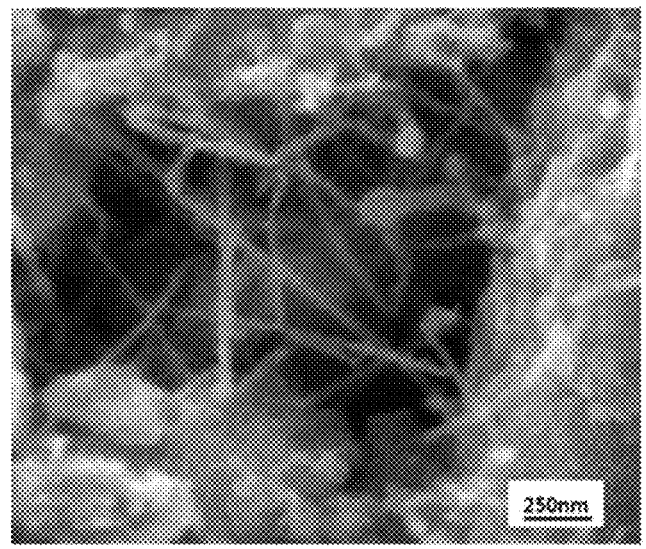
FIG. 10 is an FE-SEM photo of the surface of the catalyst which is prepared by reduction heat treatment with a supercritical fluid treatment after supporting of catalyst, according to Example 19.

FIG. 10 is an FE-SEM photo of the surface of the catalyst prepared in Example 19. As illustrated in FIG. 10, it can be seen that nickel as the catalytically active component is distributed and coated well on all the surfaces of the silicon carbide nanocomposite and nanowires.

Example 20

A supported cobalt catalyst was prepared in the same manner as in Example 18, except that the catalytically active material precursor was reduced by penetrating cobalt nitrate hexahydrate instead of nickel nitrate hexahydrate, increasing temperature from normal temperature to 500° C. under a hydrogen gas atmosphere at a rate of 5° C. per minute, maintaining the silicon carbide nanocomposite structure by which the catalytically active material precursor was supported at 500° C. for 6 hours, and again decreasing temperature to normal temperature at a rate of a rate of 5° C. per minute to reduce the catalytically active material precursor.

The specific surface area of the supported cobalt catalyst prepared by the method was found to be 45.6 $m^2/g$ as measured by the BET method.

Figure 11:
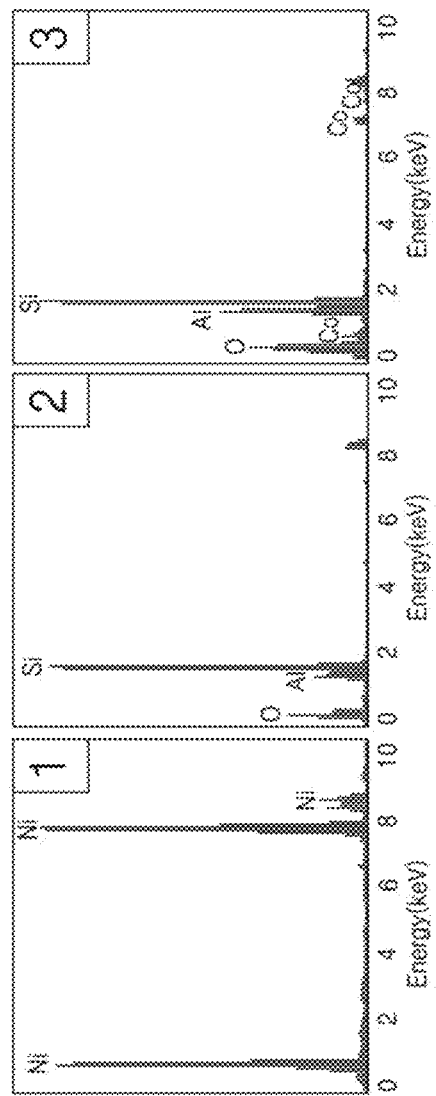
FIG. 11 is results of TEM/EDX analysis at each site of a nanowire on which cobalt is supported as a catalytically active component according to Example 20 of the present invention.

FIG. 11 is results of TEM/EDX analysis at each site of a nanowire by which cobalt was supported as the catalytically active component, which was prepared according to Example 20. As illustrated in FIG. 11, it can be seen that cobalt is supported by the nanowire site.

Figure 12A:
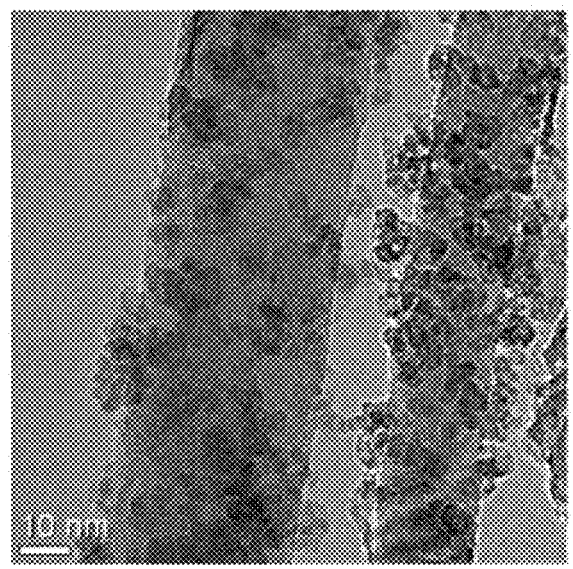
FIGS. 12A and 12B are TEM images of the cobalt-supported catalyst prepared according to Example 20.

FIG. 12A is a TEM image of a nanowire body portion that is self-grown in a silicon carbide nanocomposite by which cobalt as a catalytically active component is supported, which has been prepared according to Example 20. Furthermore, FIG. 12B illustrates a TEM image of the nanowire body portion that is self-grown in a silicon carbide nanocomposite with respect to a supported cobalt catalyst prepared in the same manner as in Example 20 except that cobalt, which had been obtained from cobalt nitrate hexahydrate, was in an amount of 5 parts by weight based on 100 parts by weight of the silicon carbide nanocomposite structure.

Figure 12B:
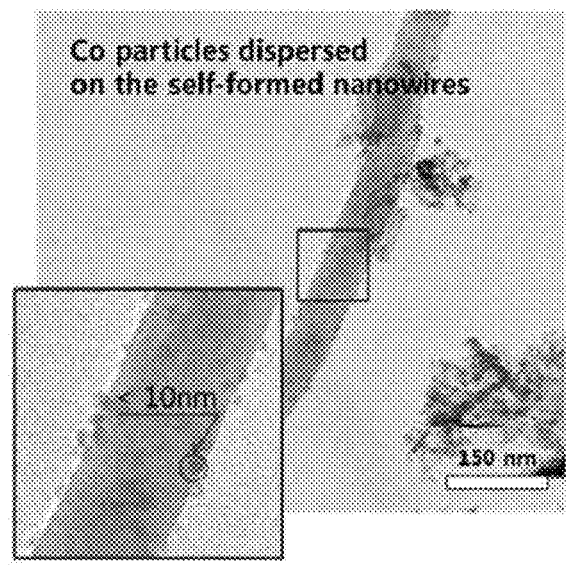
Figure 13:
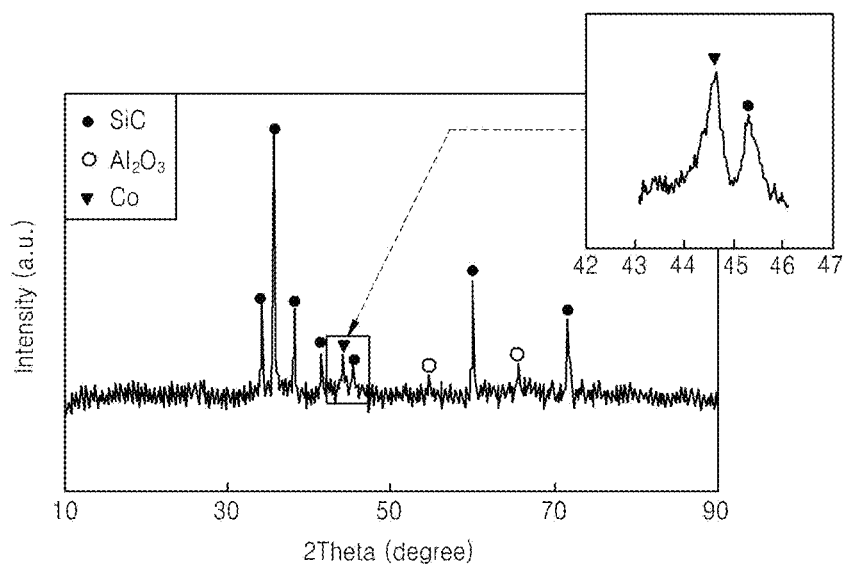
FIG. 13 is an X-ray diffraction diagram of the cobalt-supported catalyst prepared according to Example 20.

As illustrated in FIGS. 12A and 12B, it can be seen that cobalt is well-supported on the nanowire site.

Example 21

A supported cobalt catalyst was prepared in the same manner as in Example 20, except that a silicon carbide nanocomposite structure in which cobalt nitrate hexahydrate had been impregnated was put into a supercritical reactor before being reduced, a carbon dioxide fluid was injected thereinto, temperature and pressure were increased to 160° C. and 100 bar, the mixture was maintained in the obtained supercritical carbon dioxide state for 1 hour for its reaction, and then temperature was cooled to normal temperature and pressure was slowly decreased to normal pressure.

The specific surface area of the supported cobalt catalyst prepared by the method was found to be 49.3 $m^2/g$ as measured by the BET method.

The following Table 5 shows the specific surface area values of the silicon carbide nanocomposite support and the supported catalyst prepared in Example 9 and Examples 18 to 21.

TABLE 5

| Example No. | Catalyst component | Step of supporting active component | Specific surface area ($m^2/g$) |
|---|---|---|---|
| 9 | — | — | 26.9 |
| 18 | Ni | Ni impregnation → drying → reduction | 44.1 |
| 19 | Ni | Ni impregnation → drying → supercritical reaction → reduction | 48.6 |
| 20 | Co | Co impregnation → drying → reduction | 45.6 |
| 21 | Co | Co impregnation → drying → supercritical reaction → reduction | 49.3 |

As illustrated in Table 5, it can be seen that when the supported catalytically active material precursor is treated with supercritical carbon dioxide before being reduced, the specific surface area of the catalyst may be increased.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A silicon carbide nanocomposite structure comprising:
   a silicon carbide nanocomposite having a meso-macro pore structure; and
   a Si—Al—O-based nanowire formed on a surface of and inside the silicon carbide nanocomposite,
   wherein the nanowire comprises Si as a main component, and Al and O elements,
   wherein the silicon carbide nanocomposite structure further comprises transition metal nanoparticles consisting of transition metal, and
   wherein the transition metal nanoparticles are present at a head of the Si—Al—O-based nanowire.

2. The silicon carbide nanocomposite structure according to claim 1, wherein the nanowire has a diameter from 10 to 100 nm.

3. The silicon carbide nanocomposite structure according to claim 1, wherein the inorganic binder is aluminum oxide, silicon oxide, or magnesium oxide.

4. The silicon carbide nanocomposite structure according to claim 1, wherein the transition metal nanoparticles are nickel or cobalt.

5. The silicon carbide nanocomposite structure according to claim 1, wherein the meso pore has a diameter from 2 to 50 nm and a pore volume is from 0.05 to 2 $cm^3/g$.

6. The silicon carbide nanocomposite structure according to claim 1, wherein the macro pore has a diameter from 50 to 5,000 nm and a pore volume is from 0.05 to 20 $cm^3/g$.

7. A method of preparing the silicon carbide nanocomposite structure according to claim 1, the method comprising:
    forming a composite comprising silicon carbide, an inorganic binder, and transition metal nanoparticles by treating a mixture comprising a silicon carbide particle, an inorganic binder precursor, and a transition metal precursor with supercritical carbon dioxide;
    adding a binder to the composite and then molding the binder-added composite, to thus obtain a molded body; and
    sintering the molded body.

8. The method according to claim 7, wherein the treating of the mixture comprising a silicon carbide particle, an inorganic binder precursor, and a transition metal precursor with supercritical carbon dioxide is performed by first treating the silicon carbide particles and the inorganic binder precursor with supercritical carbon dioxide, adding the transition metal precursor thereto, and then again treating the mixture with supercritical carbon dioxide, or
    mixing the silicon carbide particle, the inorganic binder precursor, and the transition metal precursor and treating the mixture with supercritical carbon dioxide at a time.

9. The method according to claim 7, wherein the forming of a composite comprising silicon carbide, an inorganic binder, and transition metal nanoparticles by treating the mixture with supercritical carbon dioxide comprises obtaining a uniformly mixed fluid after introducing the mixture into a supercritical carbon dioxide reactor; and
    forming the composite comprising silicon carbide, the inorganic binder, and the transition metal nanoparticles by warming and pressurizing the mixed fluid in the supercritical reactor.

10. The method according to claim 7, wherein the inorganic binder precursor is one or more selected from aluminum nitrate, aluminum chloride, aluminum sulfate, aluminum acetate, aluminum oxalate, aluminum formate, aluminum propionate, and aluminum alkoxide.

11. The method according to claim 7, wherein the inorganic binder precursor is used in an amount to provide a weight ratio of the silicon carbide and the inorganic binder of from 1:9 to 9:1, when the inorganic binder is formed by the reaction of the inorganic binder precursor.

12. The method according to claim 7, wherein the transition metal precursor is one or more selected from nickel nitrate, nickel chloride, nickel sulfide, nickel oxalate, nickel citrate, nickel formate, and nickel acetate.

13. The method according to claim 7, wherein the composite is molded into a form of cylindrical or spherical bead.

14. The method according to claim 7, wherein the supercritical carbon dioxide treatment is performed at a temperature from 30 to 300° C. and a pressure from 0.5 to 30 bar.

15. The method according to claim 7, wherein when the sintering is performed at 800 to 1,300° C.

16. A catalyst comprising:
    the silicon carbide nanocomposite structure according to claim 1; and
    a catalytically active component supported by the silicon carbide nanocomposite structure.

17. The catalyst according to claim 16, wherein the catalytically active component is one or more selected from Ni, Co, Pt, Pd, Rh, Cu, Fe, Ag, and Au.

18. A method of preparing a catalyst, the method comprising:
    supporting a catalytically active component precursor by the silicon carbide nanocomposite structure according to claim 1; and
    subjecting the silicon carbide nanocomposite structure by which the catalytically active component precursor is supported to heat treatment under a hydrogen gas atmosphere.

19. The method according to claim 18, further comprising performing a supercritical carbon dioxide treatment prior to the heat treatment.

* * * * *